(12) United States Patent
Tagawa et al.

(10) Patent No.: US 7,373,209 B2
(45) Date of Patent: May 13, 2008

(54) SOUND FEATURES EXTRACTING APPARATUS, SOUND DATA REGISTERING APPARATUS, SOUND DATA RETRIEVING APPARATUS, AND METHODS AND PROGRAMS FOR IMPLEMENTING THE SAME

(75) Inventors: Junichi Tagawa, Hirakata (JP); Hiroaki Yamane, Kadoma (JP); Masayuki Misaki, Kobe (JP)

(73) Assignee: Matsushita Electric Industrial Co., Ltd., Kadoma (JP)

( * ) Notice: Subject to any disclaimer, the term of this patent is extended or adjusted under 35 U.S.C. 154(b) by 1060 days.

(21) Appl. No.: 10/101,569

(22) Filed: Mar. 20, 2002

(65) Prior Publication Data
US 2002/0172372 A1    Nov. 21, 2002

(30) Foreign Application Priority Data
Mar. 22, 2001 (JP) ............................. 2001-082150
Jul. 23, 2001 (JP) ............................. 2001-221240

(51) Int. Cl.
*G06F 17/00*    (2006.01)
(52) U.S. Cl. ............................. 700/94; 381/98; 381/56; 84/623; 84/627; 707/1
(58) Field of Classification Search ................. 381/56, 381/61, 98; 84/612, 622, 636, 654, 681, 84/623, 627; 700/94; 707/1
See application file for complete search history.

(56) References Cited

U.S. PATENT DOCUMENTS 5,250,745 A    10/1993   Tsumura
5,256,832 A *  10/1993   Miyake ........................ 84/636
5,536,902 A *   7/1996   Serra et al. ................... 84/623
5,544,248 A *   8/1996   Date ............................ 381/56
5,918,223 A *   6/1999   Blum et al. ..................... 707/1
6,201,176 B1    3/2001   Yourlo (Continued)

FOREIGN PATENT DOCUMENTS

JP    4-30382 A    2/1992

(Continued)

OTHER PUBLICATIONS

Scheirer, E. et al. "Construction and Evaluation of A Robust Multifeature Speech/Music Discriminator" Apr. 1997, pp. 1331-1334, IEEE Computer Society, USA.

(Continued)

*Primary Examiner*—Vivian Chin
*Assistant Examiner*—Jason Kurr
(74) *Attorney, Agent, or Firm*—Smith Patent Office

(57) ABSTRACT

The present invention implements a method and an apparatus for retrieving a sound data desired by the user on the basis of its subjective impression over the sound data. The subjective impression on the desired sound data is entered by the user and converted to a numerical value. A target sound impression value which is a numerical form of the impression on the sound data is calculated from the numerical value. The target sound impression value is then used as a retrieving key for accessing a sound database where the audio signal and the sound features of a plurality of the sound data are stored. This allows the desired sound data to be retrieved on the basis of the subjective impression of the user on the sound data.

17 Claims, 13 Drawing Sheets

U.S. PATENT DOCUMENTS

| | | | |
|---|---|---|---|
| 6,323,412 B1 * | 11/2001 | Loo | 84/636 |
| 6,542,869 B1 * | 4/2003 | Foote | 704/500 |
| 6,745,155 B1 * | 6/2004 | Andringa et al. | 702/189 |
| 6,901,362 B1 * | 5/2005 | Jiang et al. | 704/214 |
| 7,031,980 B2 * | 4/2006 | Logan et al. | 707/104.1 |
| 2002/0037083 A1 * | 3/2002 | Weare et al. | 381/58 |

FOREIGN PATENT DOCUMENTS

| | | | |
|---|---|---|---|
| JP | 4-336599 | A | 11/1992 |
| JP | 5-35287 | A | 2/1993 |
| JP | 5-27751 | A | 5/1993 |
| JP | 6-290574 | A | 10/1994 |
| JP | 7-64544 | A | 3/1995 |
| JP | 7-121556 | A | 5/1995 |
| JP | 8-195070 | A | 7/1996 |
| JP | 9-293083 | A | 11/1997 |
| JP | 10-124078 | A | 5/1998 |
| JP | 10-134549 | A | 5/1998 |
| JP | 10-155195 | A | 6/1998 |
| JP | 11-120198 | A | 4/1999 |
| JP | 11-184467 | A | 7/1999 |
| JP | 2000-35796 | A | 2/2000 |
| JP | 2000-172693 | A | 6/2000 |
| JP | 2000-356996 | A | 12/2000 |

OTHER PUBLICATIONS

Zhang, T. et al. "Hierarchical Classification of Audio Data for Archiving and Retrieving" Mar. 1999, pp. 3001-3004, IEEE, USA.

Wold, E. et al. "Content-Based Classification, Search, and Retrieval of Audio" 1996, pp. 27-36, vol. 3, No. 3, IEEE Multimedia, IEEE Computer Society, USA.

Welsh, M. et al. "Querying Large Collections of Music for Similarity" Nov. 1999, 13 pages, No. 1096, US Berkley Technical Report, USA.

Goto, M. et al., "A Real-Time Beat Tracking System for Musical Acoustic Signals", 1994, pp. 49-56, vol. 94, No. 71, The Information Processing Society of Japan.

Goto, M. et al., "A Beat Tracking System for Musical Audio Signals—Bar-Line Detection and Musical Knowledge Selection Based on the Presence Drum-Sounds—", Music and Computer Science 21-8, Jul. 1997, pp. 45-52, vol. 97, No. 67, The Information Processing Society of Japan.

Tagawa, J. et al. "A Study on Tempo Estimation for Acoustic Musical Signals", Proceedings for the Meeting of the Acoustical Society of Japan, Sep. 2000, pp. 529-530, Japanese Institute of Acoustic Technology Proceeding.

Wold, E. et al. "Content-Based Classification, Search, and Retrieval of Audio" IEEE MultiMedia, 1996, pp. 27-36, vol. 3, No. 3, IEEE Computer Society, USA.

* cited by examiner

F I G. 3
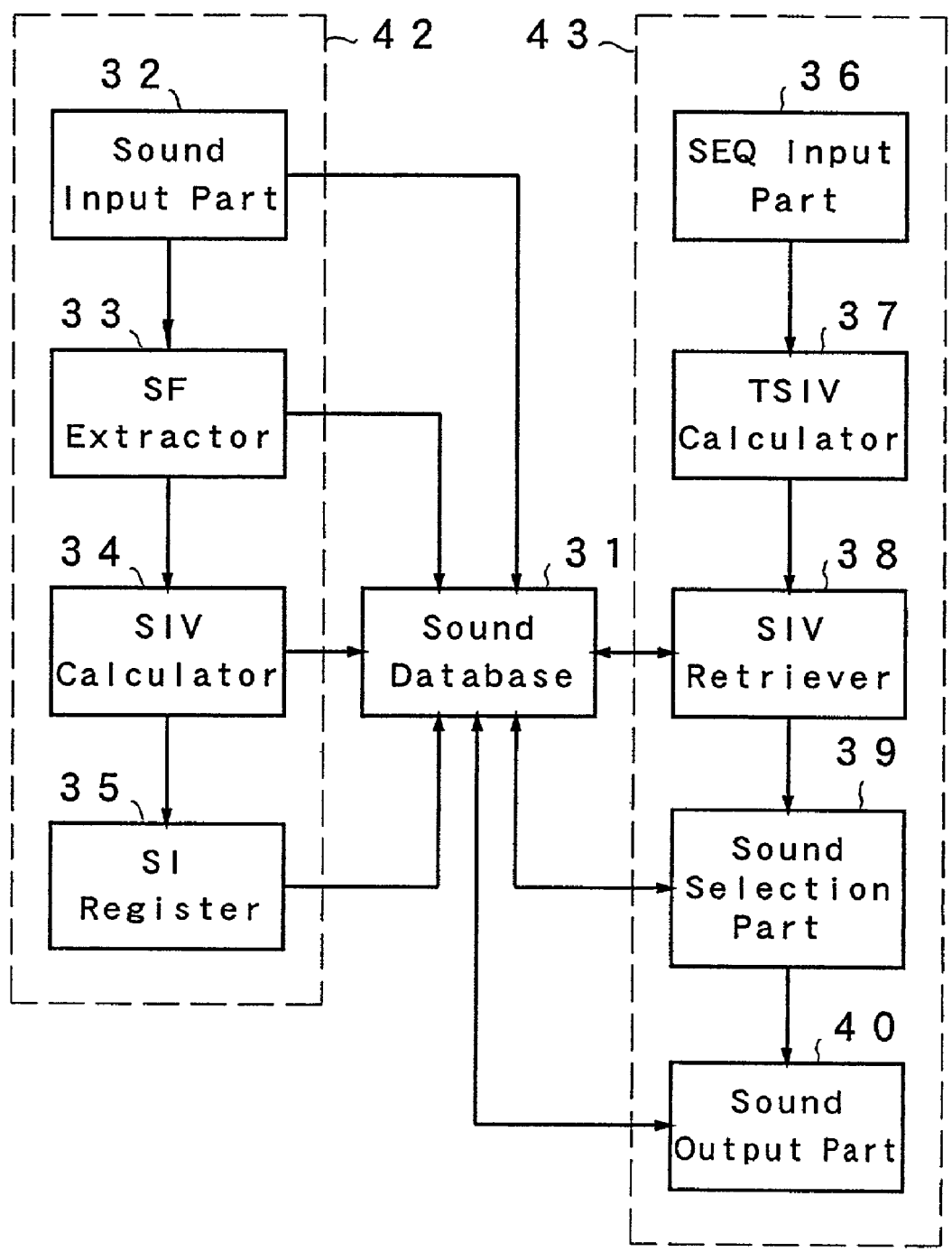

F I G. 5

| Sound Features | Symbols | Description |
|---|---|---|
| Spectral Fluctuation | SF | degree of spectrum change between frams |
| Attack Point Ratio | AR | the frequency of sound emissions in sound data |
| Attack Noisiness | NZ | degree of non-cycling of sound in sound data |
| Tempo Interval | TT | time length equivalent to the length of a quarter note |
| Beat Ratio | BR | a cycle ratio between quarter note sound and priority sound |
| Beat Intensity 1 | BI1 | intensity of sound emitted at intervals of a cycle equal to about 1/2 the beat cycle |
| Beat Intensity 2 | BI2 | intensity of sound emitted at intervals of a cycle equal to about 1/4 the beat cycle |
| Beat Intensity Ratio | IR | ratio between beat intensity 1 and beat intensity 2 |

FIG. 7

| Retrieving Queries | Examples of entry |
|---|---|
| Title | |
| Artist | "xxxx" |
| ⋮ | ⋮ |
| Hardness | 0. |
| Groovy | 1. |
| Freshness | 0. |
| Simplicity | −0. |
| Softness | −0.5 |
| ⋮ | ⋮ |
| Want to dance cheerfully | FALSE |
| ⋮ | ⋮ |

F I G. 1 0
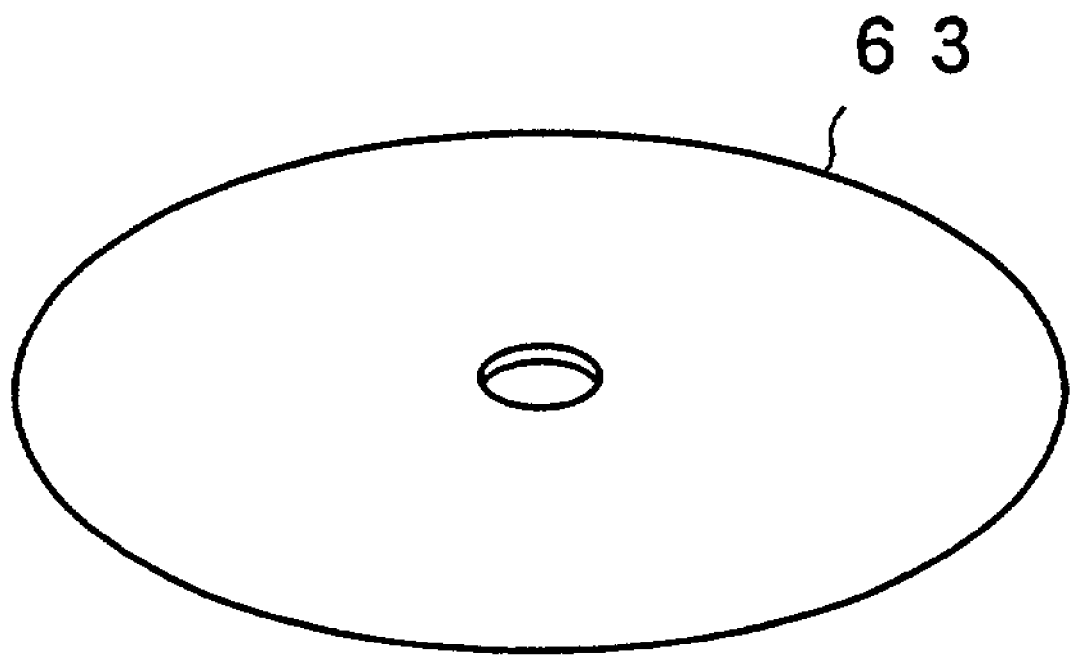

SOUND FEATURES EXTRACTING APPARATUS, SOUND DATA REGISTERING APPARATUS, SOUND DATA RETRIEVING APPARATUS, AND METHODS AND PROGRAMS FOR IMPLEMENTING THE SAME

BACKGROUND OF THE INVENTION

1. Field of the Invention

The present invention relates to a sound retrieving technology for retrieving a sound data desired by the user on the basis of sound information and subjective impressions over the sounds data. More particularly, the present invention relates to a sound feature extracting apparatus, a sound data registering apparatus, a sound data retrieving apparatus, a method for extracting sound features, a method for registering sound data, a method for retrieving sound data, and relevant programs for implementing those methods by using a computer.

2. Discussion of the Related Art

Hard disk drives and CD players with changer are types of the sound data base for storing large amounts of sound data. For retrieving a desired sound data or music piece from the sound data base, the use of a keyword such as a title, a singer, or a writer/composer of the music piece is common.

A conventional sound data retrieving apparatus (referred to as an SD retrieving apparatus hereinafter and throughout drawings) will now be explained referring to FIG. 1. FIG. 1 is a block diagram of a system arrangement of the SD retrieving apparatus. A selection query inputting part 11 (referred to as an SLQ input part hereinafter and throughout drawings) is provided for entering a requirement, e.g. a title, for selecting the sound data to be retrieved. A sound database 12 contains sound information such as titles, singers, and writers/composers and can thus be accessed any time. A sound information retriever 13 (referred to as an SI retriever hereinafter and throughout drawings) is provided for accessing the sound database 12 with a retrieving key such as a title entered from the SLQ input part 11 to retrieve and obtain some sound data equal or similar to the key data. A play sound selecting part 14 (referred to as a PS selector hereinafter and throughout drawings) is provided for finally selecting the desired sound dada by the user from the outcome obtained by the SI retriever 13. A sound output part 15 is provided for reading out from the sound database 12 and reproducing a sound signal of the sound data selected by the PS selector 14.

The action of the sound data retrieving system is explained in conjunction with an example. It is assumed that a user desires to retrieve and listen to a sound data A. The user enters "A" on the title section of the SLQ input part 11 to command the retrieval of sound data which include "A" in their titles. In response, the SI retriever 13 accesses the sound database 12 for retrieving some sound data including "A" in their titles and releases output of some sound data. It is now assumed that the sound data include three different titles "A1", "A2", and "A3". Using the three titles, the user directs the PS selector 14 to examine their relevant sound information, such as singers and writers/composers, and selects one of the sound data. The selected sound data is then reproduced by the sound output part 15.

However, the sound information including titles, singers, and writers/composers may be objective or external data. It is hence difficult to assume the subjective impression attributed to the user from the sound information. For example, the selection of a sound data based on a subjective expression "lively sound data" will hardly be realized with any conventional SD retrieving apparatus.

Such psychological impression over audible sounds of the sound data may be quantized as numerical data or a sound impression value. It is possible for implementation of the retrieval of a sound data from its sound impression value to index (quantize) and register the subjective impression on each sound data in the sound database 12 which can then be retrieved. However, the indexing and registering of the subjective impression on sound data largely depends on the user or operator of the system. Accordingly, when sound data to be registered is huge in the amount, its handling will be a troublesome task.

The sound data retrieving technique of the present invention is capable of extracting the physical features from the sound signal of each sound data and retrieving the sound data desired by users using the subjective sound impression value determined over the sound data.

Meanwhile, such a sound features extractor (referred to as an SF extractor hereinafter and throughout drawings) in the sound data retrieving system may be implemented by a tempo extractor. Tempo represents the speed of a sound data and is an inverse of the cycle of beat. Tempo is generally expressed by the number of quarter notes per minute. One of conventional tempo extractors is disclosed in Japanese Patent Laid-open Publication (Heisei) 5-27751, "Tempo extraction device used for automatic music transcription device or the like".

The conventional tempo extractor is shown in FIG. 2. The conventional tempo extractor comprises a signal receiver 21, a measure time length calculator 27, and a temp calculator 26. The measure time length calculator 27 includes a power calculator 22, a differentiator 23 (referred to as a Diff), an auto-correlation calculator 24 (referred to as an ACR Calc throughout the drawing), and a peak detector 25. The measure time length calculatot 27 denoted by the broken line is provided for calculating the measure time length as a reference length.

The signal receiver 21 is provided for sampling sound signals. The power calculator 22 calculates power of a sound signal received in each processing frame. The differentiator 23 differentiates the power of each processing frame determined by the power calculator 22. The auto-correlation calculator 24 calculates an auto-correlation function of the differentiated power determined by the differentiator 23. The peak detector 25 detects the peak of the auto-correlation function to determine the periodic property of the sound signal and thus the time length of a measure as the reference length. The tempo calculator 26 hence calculates the tempo of the sound data from the measure time length and the number of beats entered separately.

More specifically, a sound signal received by the measure time length calculator 27 is processed by the power calculator 22 and the differentiator 23 to determine a power variation. The periodic property of the power variation is calculated by the auto-correlation calculator 24. The cycle peak where the periodic property is most exhibited is determined by the peak detector 25 on the basis of a reference time length that a human being naturally perceives one beat. As the time cycle is assigned as the reference measure time length, it is divided by the number of beats to determine the number of quarter notes per minutes or the tempo.

However, the peak of the auto-correlation function of the power variation may not always appear in the measure time length or time cycle. For example, when the accent of a snare drum is emphasized in the half note cycle such as of a popular, rhythm instrument oriented music score, the peak of the auto-correlation function of the power variation appears at intervals of a time equal to the time length of the half note cycle. If the peak is treated as the measure time length, the tempo may be calculated to twice the actual tempo. It is also necessary for the conventional system to input the number of beats or other data from a keyboard in advance. Accordingly, for determining the tempo, priori knowledge about the music to be handled is necessary.

The sound features extracting technique of the present invention is capable of extracting the features of a sound data without depending on the type of the sound data entered or without preparing priori data about the sound data.

SUMMARY OF THE INVENTION

A sound feature extracting apparatus according to the present invention comprises a sound data input part provided for inputting an audio signal of sound data. An SF extractor extracts sound features from the audio signal. The features of the sound data are numerical forms of the physical quantity including spectrum variation, average number of sound emission, sound emission non-periodic property, tempo interval time, tempo interval time ratio, beat intensity, and beat intensity ratio. The audio signal and its features are then stored in a sound database.

A sound data registering apparatus according to the present invention has a sound data input part provided for inputting the audio signal of a sound data. An SF extractor extracts a feature from the audio signal and registers it together with its audio signal on a sound database. A sound impression values calculator (referred to as an SIV calculator hereinafter and throughout the drawings) calculates from the feature a sound impression value which is a numerical form of the psychological impression on the sound data and records it on the sound database.

A sound data retrieving apparatus according to the present invention has a retrieving query input part provided for inputting a numerical form of each subjective requirement of the user for a desired sound data. A target (predictive) sound impression data calculator (referred to as a TSIV calculator hereinafter and throughout the drawings) calculates a predictive sound impression value which is a numerical form of the impression on the sound data to be retrieved. A sound impression value retriever (referred to as an SIV retriever hereinafter and throughout the drawings) accesses the sound database with the predictive sound impression value used as a retrieving key for retrieving the audio signal and the impression values of the sound data. As a result, the sound data can be retrieved on the basis of the subjective impression of the user over the sound data. It is also enabled to retrieve another sound data pertinent to the subjective impression on the sound data to be primarily retrieved or obtain a desired music piece with the use of sound information such as a title.

BRIEF DESCRIPTION OF THE DRAWINGS

The above and other objects and features of the present invention will be clearly understood from the following description with respect to the preferred embodiment thereof when considered in conjunction with the accompanying drawings and diagrams, in which:

FIG. 3 is a block diagram showing a schematic arrangement of an SD retrieving apparatus according to Embodiment 1 of the present invention;

FIG. 5 is an explanatory diagram showing details of the features in Embodiment 1 of the present invention;

FIG. 7 is an explanatory diagram showing an example of entry queries in Embodiment 1 of the present invention;

FIG. 10 is an external view of a CD-ROM in Embodiment 2 of the present invention;

DETAILED DESCRIPTION OF THE PREFERRED EMBODIMENTS

Embodiment 1

Figure 1:
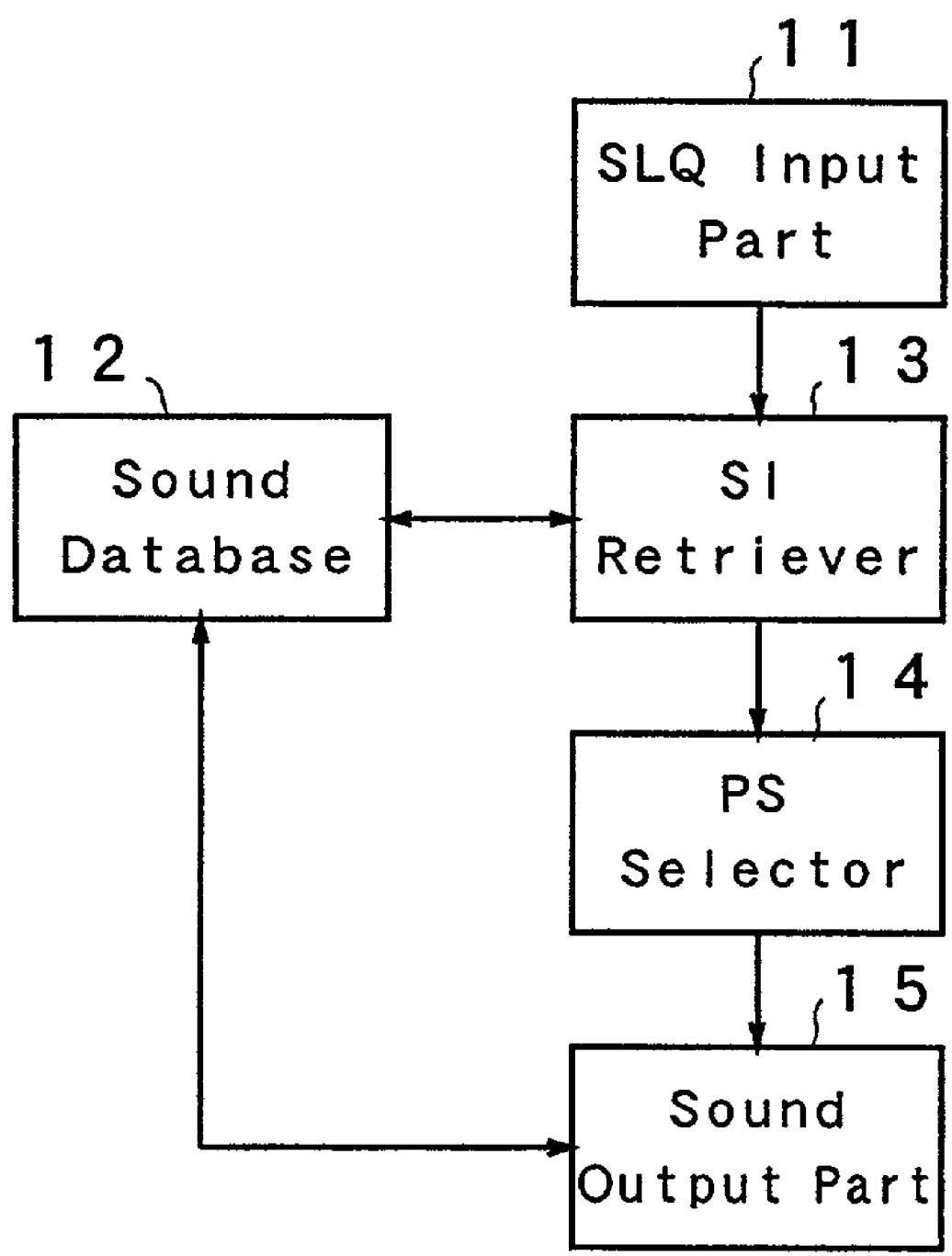
FIG. 1 is a block diagram showing a schematic arrangement of a conventional SD retrieving apparatus.
Figure 2:
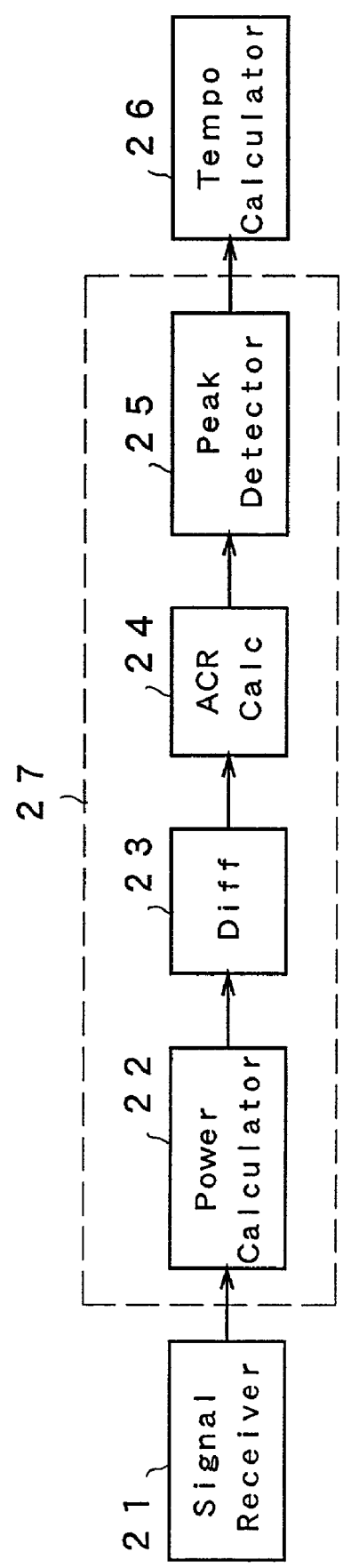
FIG. 2 is a block diagram showing an arrangement of a conventional tempo extracting apparatus.

A sound data (SD) retrieving method and apparatus according to Embodiment 1 of the present invention will be described referring to the relevant drawings. FIG. 3 is a block diagram showing an overall arrangement of an SD retrieving system of Embodiment 1. The SD retrieving system comprises a sound database 31, a sound input part 32, a sound feature extractor 33 (referred to as an SF extractor hereinafter and throughout the drawings), a sound impression value calculator 34 (referred to as an SIV calculator hereinafter and throughout the drawings), a sound information register 35 (referred to as an SI register hereinafter and throughout the drawings), a search query input part 36 (referred to as an SEQ input part hereinafter and throughout the drawings), a target sound impression values calculator 37 (referred to as a TSIV calculator hereinafter and throughout the drawings), a sound impression values retriever 38 (referred to as an SIV retriever hereinafter and throughout the drawings), a sound selection part 39, and a sound output part 40.

The sound input part 32, the SF extractor 33, the SIV calculator 34, and the SI register 35 are grouped to develop a sound data registering apparatus (referred to as an SD registering apparatus hereinafter and throughout the drawings) 42. Also, the SEQ input part 36, the TSIV calculator 37, the SIV retriever 38, the sound selection part 39, and the sound output part 40 are grouped to develop a sound data (SD) retrieving apparatus (referred to as an SD retrieving apparatus hereinafter and throughout the drawings) 43. The SD registering apparatus 42 is arranged for registering on the sound database 31 a sound signal and its relevant data of a sound data to be retrieved. The sound signal includes audio signals stored on recording mediums such as CDs and received from broadcast stations or communication lines.

The SD retrieving apparatus 43 is arranged for retrieving a desired sound data from the sound database 31 in response to the retrieving queries of each user. The sound database 31 may be implemented by a recording medium such as a hard disk or a removable medium such as a CD-ROM.

The cooperation between the SD registering apparatus 42 and the sound database 31 will now be explained in brief. The SD registering apparatus 42 extracts from the received sound signal a sound piece and its attributed data to be registered as the sound data on the sound database 31 and saves them on the sound database 31. The sound data saved in the sound database 31 includes the sound signal of each sound piece to be reproduced by the user and its attributed data. As the sound data is separately registered in the sound database 31, it creates a separate database. The attributed data includes physical sound features of the sound signal, impression values quantized from psychological sound impression values over audible sounds of the sound piece, and a sound information such as the name of a title, a player, or an artist.

Once the sound database 31 has been loaded with the sound data, it is installed in the SD retrieving system and can thus be accessed by the user for retrieval of any desired data. Also, the sound database 31 may be connected to its processing block over a network such as the Internet. In the latter case, the sound data is created by the SD registering apparatus 42 and saved in the sound database 31 over the network. This allows the sound data to be accessed by one or more SD retrieving apparatuses linked to the network. The manager of the system can refer the registered sound data any time and if desired, register or reentry another data.

The action of each block in the SD registering apparatus 42 will be described. The sound input part 32 registers the sound signal of a received sound piece on the sound database 31 and also transfers it to the SF extractor 33 for generation of its attributed data at the succeeding stage. When the received sound signal is an analog signal, it is digitized by the sound input part 32 before transferred to the succeeding stage.

The SF extractor 33 extracts from the sound signal some sound features representing the physical features of the sound signal and registers them on the sound database 31. The SIV calculator 34 converts the physical sound features of the sound data received from the SF extractor 33 into sound impression values as a quantized form of the psychological impression on audible sounds and registers them on the sound database 31. The SI register 35 registers the relevant information about the registered sound data (including a title, a name of a player, and a name of an artist) on the sound database 31.

The action of the SD retrieving apparatus 43 will now be described in brief. The queries for a desired sound data is entered by the user operating the SEQ input part 36. The TSIV calculator 37 calculates a target sound impression value of the sound data to be retrieved from the subjective impression data in the queries entered by the user. The sound impression value and the target sound impression value are numerical forms of the subjective impression on the sound data. The SIV retriever 38 then accesses the attributed data saved in the sound database 31 using the retrieving queries and the target sound impression value determined by the TSIV calculator 37 as retrieving keys. The SIV retriever 38 releases some of the sound data related with the attributed data assumed by the retrieving keys. In response, the sound selection part 39 selects a specified sound data according to the teaching of a manual selecting action of the user or the procedure of selection predetermined. Then the sound output part 40 picks up the selected sound data from the sound database 31 and reproduces the sound.

Figure 4:
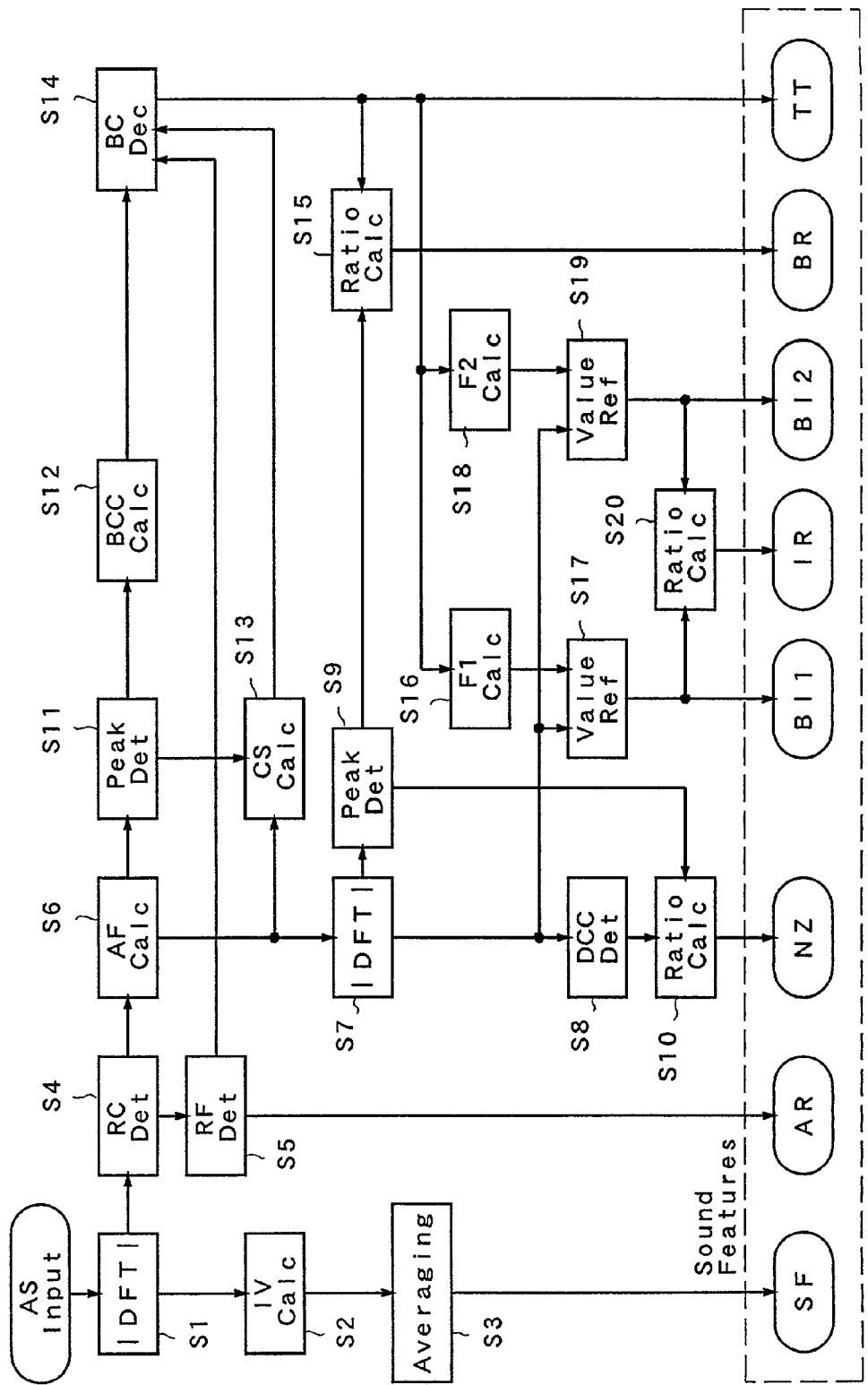
FIG. 4 is a block diagram showing a schematic arrangement of an SF extracting apparatus according to Embodiment 1 of the present invention.

The function of the SF extracting apparatus and the SF registering apparatus will now be described in detail. The SF extracting apparatus achieves a part of the function of the SD registering apparatus 42 shown in FIG. 3 and includes the sound input part 32 and the SF extractor 33. FIG. 4 is a block diagram showing a signal processing procedure of the SF extractor 33 in this embodiment. FIG. 5 is an explanatory diagram showing a list of the features and their symbols and descriptions in the embodiment.

The physical sound features listed in FIG. 5 are extracted from the sound signal by the SF extractor 33. The procedure of extracting the features shown in FIG. 5 is now explained referring to FIG. 4. It is assumed hereinafter that t is the frame time to be processed and f is the frequency band number determined by band division and that the sound signal is digitized and processed in each frame having a particular time length.

(1) Spectral Fluctuation Rate (SF)

In Step S1, the procedure starts with Fourier transforming (DFT) each frame of the received sound signal to determine a power spectrum S(t) in each divided frequency band. Then, the power spectrum variation ΔS(t) between frames is calculated using Equation 1 in Step S2 (IV Calc).

$$\Delta S(t) = \|S(t) - S(t-1)\|$$ (Equation 1)

In Step S3, the variations ΔS(t) of all the frames are averaged to determine a spectrum variation rate SFLX. Spectral Fluctuation Rate SFLX is expressed by $$SFLX = \frac{\sum_{f=1}^{N_{all}} \Delta S(t)}{N_{all}}$$ (Equation 2)

(2) Attack Point Ratio (AR)

Using a power p(t,f) of each band in the power spectrum S(t) determined at Step S1, a rise rate d(t,f) of a signal component of each band is calculated at step S4 (RC Det). Also, d(t,f) is added in the direction of frequency at the frame time t to determine a rise component D(t). Those measurements d(t,f) and D(t) can be calculated using Equations 3 to 7 with the power p(t,f) at each frequency band f.

$$p(t,f) > pp$$ (Equation 3)

$$np > pp$$

$$pp = \max(p(t-1,f), p(t-1,f \pm 1), p(t-2,f))$$ (Equation 4)

$$np = \min(p(t-1,f), p(t-1,f \pm 1))$$ (Equation 5)

$$d(t,f) = p(t+1,f) - pp \text{ if } P(t+1,f) > p(t,f)$$ (Equation 6)

$$= p(t,f) - pp$$

otherwise $$D(t) = \sum_f d(t,f)$$ (Equation 7)

The extraction of the rise rate d(t,f) and the rise component D(t) is explicitly explained in a reference, such as "Beat tracking system for music audio signals" by Gotoh and Muraoka, the Information Processing Society of Japan, Proceeding Vol.94, No.71, pp. 49-56, 1994. In Step S5 (RF Det), the frequency of appearance of the rise rate d(t,f) throughout all the frames is calculated using Equation 8 to determine an Attack Point Ratio AR.

$$AR = \text{mean}\left(\sum_f \text{boolean}(d(t,f))\right) \quad \text{(Equation 8)}$$

(3) Attack Noissiness (NZ)

In Step S6 (AF Calc), the auto-correlation function A(m) (m being a delayed frame number) of D(t) is calculated using Equation 9 to determine the periodicity of the rise component. In Step S7, A(m) is Fourier transformed to a power at each band for determining a power spectrum $A_{spec}(K)$ of A(m) (K being a frequency). In Step S8 (DCC Det), a direct-current component $A_{spec}(0)$ of $A_{spec}(K)$ is detected. In Step S9 (Peak Det), the peak $A_{spec}(K_{peak})$ of $A_{spec}(K)$ is extracted. In Step S10 (Ratio Calc), the ratio between $A_{spec}(0)$ and $A_{spec}(K_{spec})$ is calculated to determine an Attack Noissiness NZ using Equation 10.

$$A(m) = \sum_{n=0}^{N-1} D(t)D(t+m) \quad \text{(Equation 9)}$$

$$NZ = A\text{spec}(0)/A\text{spec}(K\text{peak}) \quad \text{(Equation 10)}$$

(4) Tempo Interval Time (TT)

The Tempo interval Time TT is an inverse of tempo representing the distance between beats or the length of each quarter note of the sound data. The Tempo interval Time TT is detected from the auto-correlation function A(m) of the rise component D(t). In Step S11 (Peak Det), the peak of A(m) or the time length pk(i) where the cycle of rise component is most exhibited is calculated. In Step S12 (BCC Calc), some candidates T1 and T2 of the tempo interval time is calculated from pk(i). In Step S13 (CS Calc), the cycle structure of the sound data is determined. In Step 14 (BC Dec), one of T1 and T2 is selected through referring the Attack Point Ratio AR and the cycle structure and released as the tempo interval time of the sound data.

An example of calculating the tempo interval time is depicted in "An approach to tempo detection from music signals" by Tagawa and Misaki, Japanese Institute of Acoustic Technology Proceeding, pp. 529-530, 2000.

(5) Beat Ratio (BR)

The Beat Ratio is calculated from the relation between the tempo interval time and superior the sound cycle. In Step S15 (Ratio Calc), the time cycle $T_{kpeak}$ correspond to $A_{spec}(K_{peak})$ is calculated and then the Beat Ratio BR between the Tempo interval Time TT and the time cycle $T_{kpeak}$ is determined using Equation 11.

$$BR = TT/T\text{kpeak} \quad \text{(Equation 11)}$$

(6) Beat Intensity 1 (BI1)

The power of a rise component which appears at intervals of substantially a half the tempo interval time is calculated. In Step S16 (F1 Calc), the frequency f1 equivalent to a half the tempo interval time is calculated from the Tempo interval Time TT. In Step S17 (Value Ref), the peak of $A_{spec}(K)$ which exhibits maximum adjacent to f1 is referred and assigned as BI1.

(7) Beat Intensity 2 (BI2)

Similarly, the power of a rise component which appears at intervals of substantially ¼ the tempo interval time is calculated. In Step S18 (F2 Calc), the frequency f2 equivalent to half the tempo interval time is calculated from the Tempo interval Time TT. In Step S19 (Value Ref), the peak of $A_{spec}(K)$ which exhibits maximum adjacent to f2 is referred and assigned as BI2.

(8) Beat Intensity Ratio (IR)

In Step 20 (Ratio Calc), the ratio IR between the beat intensity BI1 and the beat intensity BI2 is calculated using Equation 12.

$$IR = BI1/BI2 \quad \text{(Equation 12)}$$

The above described sound features are numerical forms of the acoustic features of the sound data which are closely related to the subjective impression perceived by an audience listening to music of the sound data. For example, the tempo interval time is a numerical indication representing the tempo or speed of the sound data. Generally speaking, fast sounds give "busy" feeling while slow sounds give "relaxing". This sense of feeling can be perceived without consciousness in our daily life. Accordingly, the prescribed features are assigned as the numerical data representing the subjective impressions.

The sound features determined by the SF extractor 33 in FIG. 3 and listed in FIG. 5 are then received by the SIV calculator 34. The SIV calculator 34 converts the features into their impression values using Equation 13. In other words, the features are converted by the SIV calculator 34 into corresponding numerical data which represent the subjective impressions.

$$Ii = \sum_{j=1}^{Np} Wij \cdot Pj \quad \text{(Equation 13)}$$

where $I_i$ is the sound impression values based on an impression factor i, $P_j$ is the value a sound features j, $W_{ij}$ is the weighted coefficient representing the relation between the sound features j and the impression factor i, and $N_p$ is the number of sound features. This embodiment permits $N_p=8$ as shown in FIG. 5 while $P_j$ depends on the individual sound features. The sound impression values $I_i$ is a numerical form of the subjective impression perceived from the sound which can represent a degree ($E_j$) of the impression expressed by a particular adjective. For example, when the impression is classified into five different degrees: "hard ($E_1$)", "groovy ($E_2$)", "fresh ($E_3$)", "simple ($E_4$)", and "soft ($E_5$)", the sound impression values Ii can be calculated from $E_j$ using Equation 14.

$$Ii = \sum_{j=1}^{Ni} Yij \cdot Ej \quad \text{(Equation 14)}$$

where $Y_{ij}$ is the weighted coefficient representing the relation between $E_j$ and $I_i$.

The weighted coefficient $Y_{ij}$ and the impression factor $N_i$ are preliminarily prepared from $E_j$ measurements determined from some music samples in a series of sensual evaluation tests using a semantic differential (SD) technique. The results of the tests are subjected to factor analysis such as main component analyzing to determine the weighted coefficient $Y_{ij}$ and impression factor $N_i$. The weighted coefficient $W_{ij}$ is calculated by determining $Y_{ij}$ from the sensual evaluation and the factor analysis, calculating the impression value $I_i$ of each sample using Equation 14, and examining the relation between the impression value $I_i$ and the sound features $P_j$ by e.g. linear multiple regression analysis. Alternatively, the sound features $P_j$ and the sound impression values $I_i$ may be determined with the use of a non-linear system such as a neutral network.

Figure 6:
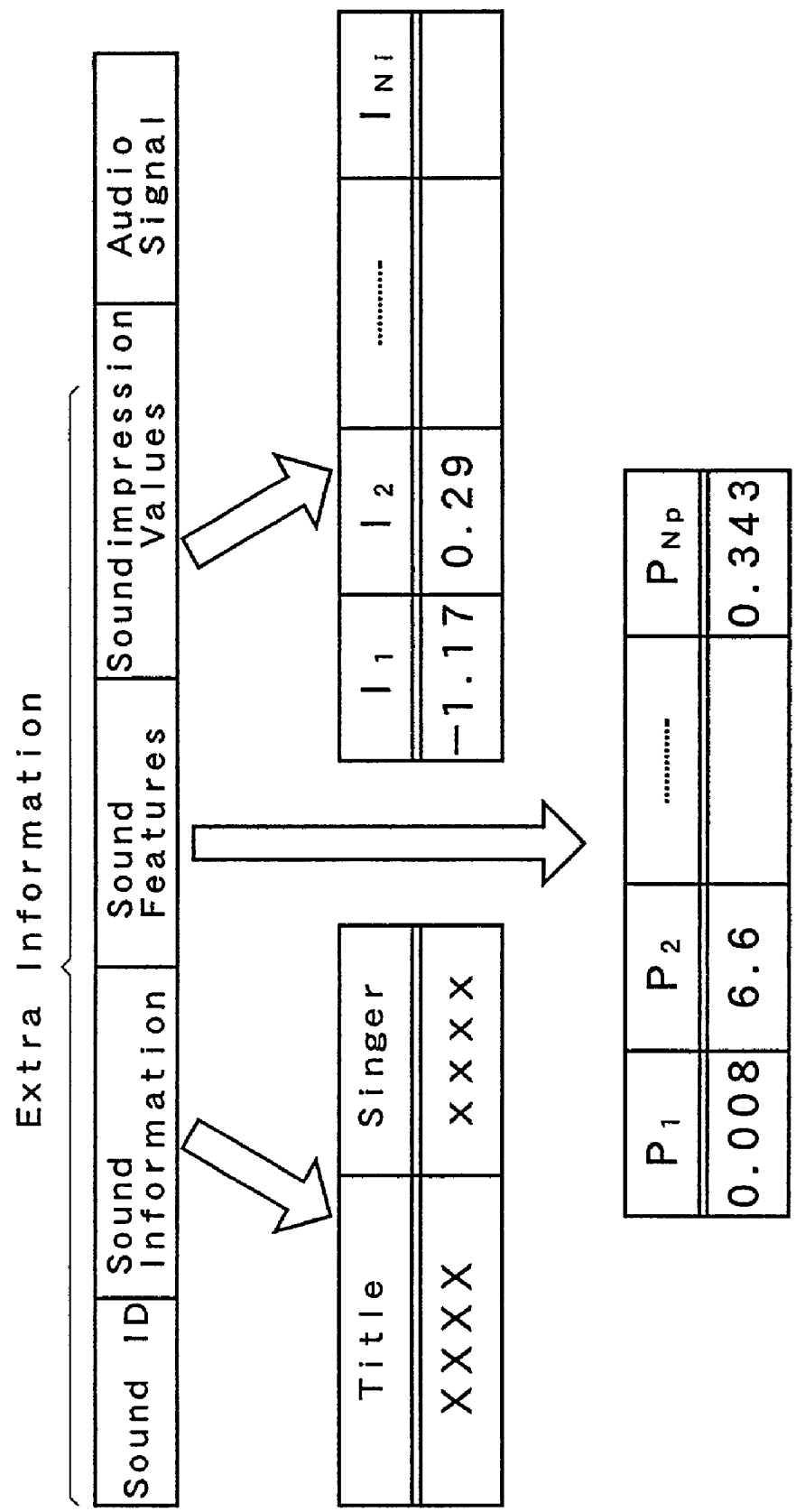
FIG. 6 is an explanatory diagram showing records in a sound database in Embodiment 1 of the present invention.

The sound database 31 shown in FIG. 3 is a multiplicity of records including the sound signal and its attributed data of each music piece. An example of the record stored in the sound database 31 according to this embodiment is illustrated in FIG. 6. The record comprises:

(1) ID data for identifying the record at once;

(2) sound information about a music piece including a title, a singer, and an artist entered from the sound information register 35;

(3) sound features extracted by the SF extractor 33;

(4) sound impression values determined from the sound features by the feature/impression converter; and (5) sound signal of the music piece received by the sound input part 32.

The action of the SD retrieving apparatus 43 in relation to the function of the SF extractor 33 will now be described. First, the queries for retrieving a music piece desired by the user are entered from the SEQ input part 36. An example of the queries to be entered is shown in FIG. 7. The queries include sets of characters indicating a title and an artist, numerical values representing the "hardness" impression (for example, normalized within a limited range from +1.0 to −1.0), and other requirements such as "want to dance cheerfully". The queries are entered by the user operating a keyboard, an array of switches, sliders, and volume knobs, or other appropriate controls.

The TSIV calculator 37 then calculates the sound impression values $PI_i$ (a target sound impression values) predicted for the target sound data from the subjective impression factors (subjective factors) in the queries entered from the SEQ input part 36. The target sound impression values $PI_i$ can be calculated from the weighted coefficient $Y_{ij}$ using Equation 15.

$$PI_i = \sum_{j=1}^{Ni} Yij \cdot IEj \quad \text{(Equation 15)}$$

where $IE_j$ is the numerical value of subjective impression such as a degree of "hard" impression. The value $IE_j$ may be selected from a number of the impression factors of each music piece determined during the calculation of the weighted coefficient $Y_{ij}$.

The other requirement based on two or more of the subjective impressions, such as "want to dance cheerfully", is preset with a corresponding $IE_j$ value. When the requirement is desired, its preset value is used for calculating the target sound impression values $PI_i$ from Equation 15. For example, when the subjective impression is graded between the maximum of 1.0 and the minimum of −1.0, the requirement "want to dance cheerfully" may be translated into "highly groovy and highly fresh". Accordingly, the preset values are IE1=0.5 for "hardness", IE2=1.0 for "groovy", IE3=1.0 for "freshness", IE4=0.0 for "simplicity", and IE5=0.0 for "softness". The target impression value $PI_i$ is then calculated from these numerals of $IE_j$.

Figure 8:
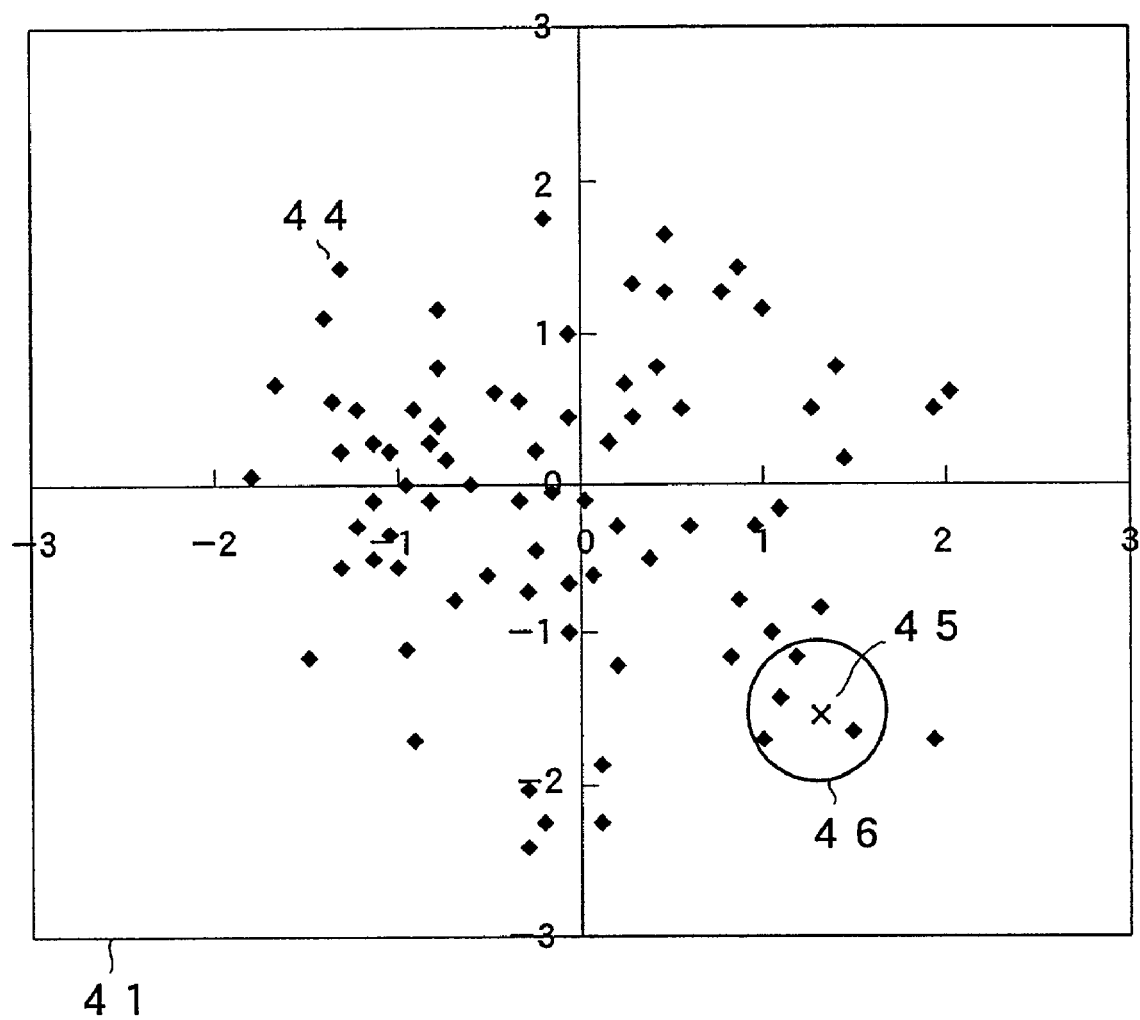
FIG. 8 is a schematic diagram of an impression space.

The SIV retriever 38 accesses and reads out a record corresponding to the keys of the sound information and the target sound impression values $PI_i$ from the sound database 31. The sound information is examined for matching with the sound information stored as parts of the records in the sound database 31. More specifically, the similar record can be extracted through examining inputted the characters in the sound information. The similarity between the target sound impression values $PI_i$ impression values of each record stored in the sound database 31 is evaluated and retrieved. FIG. 8 illustrates a space diagram where the sound impression values are plotted for examining the similarity.

The sound impression values $I_i$ of each music piece in the record is expressed as a vector in the space consisting of an $N_i$ of the impression factor. This space is called an impression space. The impression space shown in FIG. 8 is based on the impression factor $N_i=2$ where the impression value $I_i$ is a two-dimensional point 44. Similarly, the target sound impression values $PI_i$ can also be expressed in the impression space and, for example, a point 45 represents specified subjective impression. The similarity between the target sound impression values $PI_i$ and the sound impression values $I_i$ is hence defined by the Euclidean distance of in the impression space which is denoted by L and calculated from the following equation 16.

$$L = \sum_{i=1}^{Ni} \sqrt{(PIi - Ii)^2} \quad \text{(Equation 16)}$$

The distance L is calculated throughout a set of the music pieces to be retrieved. The smaller the distance L, the more the similarity to the target sound impression values is recognized. The music piece having the minimum of the distance L is regarded as the first of the candidates. Candidates of the predetermined number are released as the results. As shown in FIG. 8, the similarity may be defined as a circular area about the sound impression values so that all the candidates in the area are released as the resulting outputs. In the latter case, it is possible that the similarity is limited to a predetermined level and any music piece smaller than the level will be discarded.

The retrieving action with the sound information and the retrieving action with the subjection impression may be carried out separately or in a combination. This may be select by the user through a operation of the SEQ input part 36.

Alternatively, the candidates are selected using the sound information inputted through the SEQ input part 36 and then their sound impression values are utilized as target sound impression values for retrieving another music piece. According to such operations, the user may retrieve other sound data similar in the subjective respects to the target sound data. For example, as a title "B1" is entered by the user, it is then used as the retrieving key for accessing the sound database 31. Once the title "B1" is received from the sound database 31, its impression value is used as the target sound impression value for accessing again the sound database 31. Accordingly, more sound data similar to the first received sound data can be retrieved on the basis of the subjective impression of the retrieved sound data. In the example, the title "B2" which has similar impression to that of the title "B1" can be obtained.

The SEQ input part 36 may also be equipped with an SD input part, an SF extractor, and an SIV calculator identical to those in the SD registering apparatus 42. Accordingly, since the sound features are calculated from a received sound signal and used as the sound impression values for accessing the sound database 31, more sound data similar to the sound data of the received sound signal can favorably be obtained.

A group of the candidates determined by the SIV retriever 38 are further classified by the sound selection part 39. The sound selection part 39 submits the attributed data (a title, an artist, etc.) about the candidates to the user and demands for selection of the sound data to be reproduced. The selection may be conducted through listening to all or parts of each candidate on the sound output part 40.

When the retrieving action is based on the subjective requirement, the similarity between the subjective impression determined by the user and the data of the candidates may be examined from the distance L received from the SIV retriever 38. Also, the similarity may be displayed to the user. The selection from the candidates may automatically be carried out using not a command from the user but a predetermined manner complying to, for example, "the first candidate is the selected sound data". The display of the relevant data to the user is implemented by means of a display monitor or the like while the command for the selection can be entered by the user operating a keyboard, switches, or other controls.

The sound data selected by the sound selection part 39 is then transferred to the sound output part 40 for providing the user with its audible form. Alternatively, the selected sound data may simply be displayed to the user as the result of retrieval of the sound information, such as a title, without being reproduced.

Embodiment 2

Figure 9:
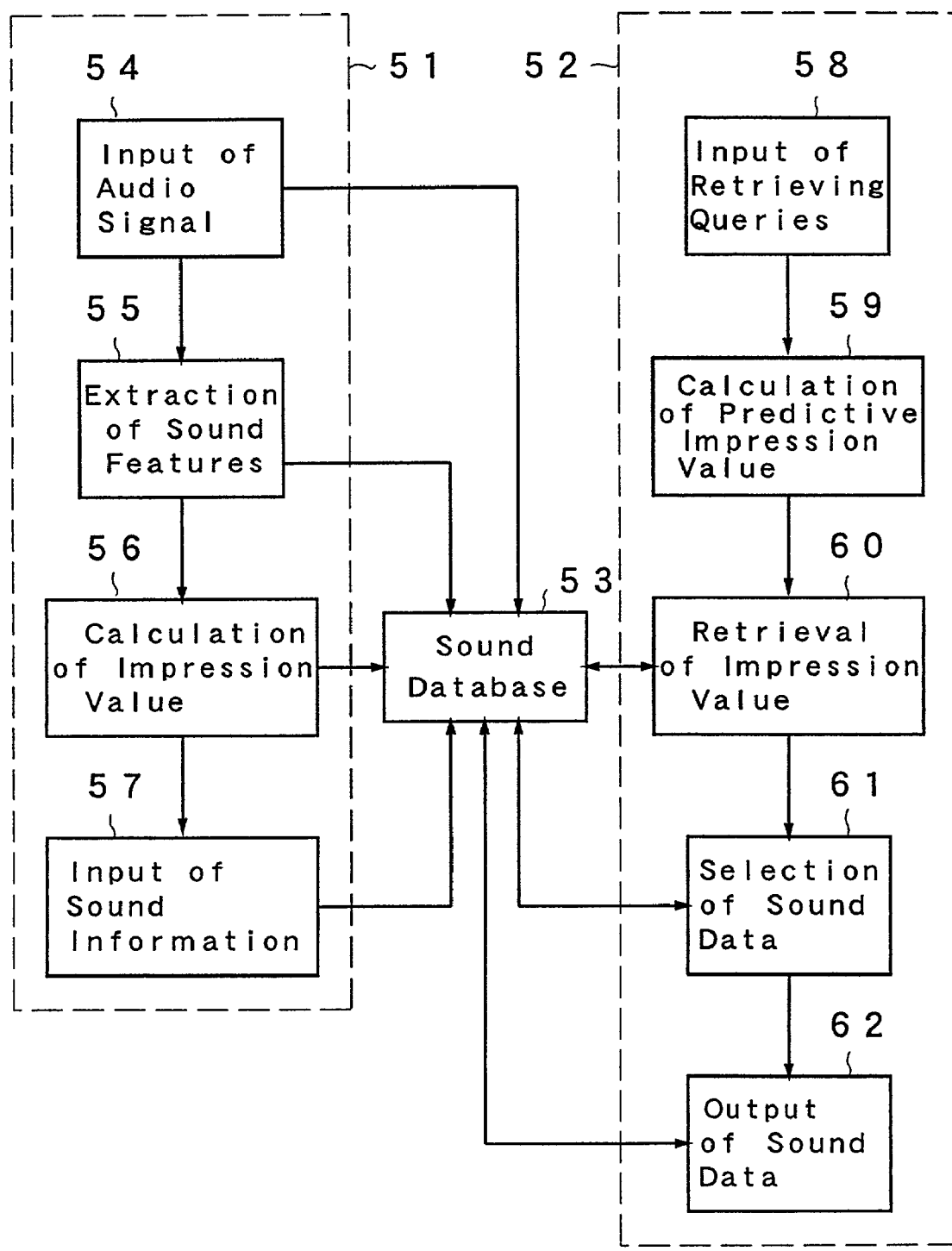
FIG. 9 is a block diagram showing a schematic arrangement of an SD retrieving program according to Embodiment 3 of the present invention.

Embodiment 2 of the present invention will be described in the form of a program for retrieving sound data. More particularly, this embodiment is a computer program for implementing the above described function of Embodiment 1. FIG. 9 is a block diagram of a procedure of signal processing showing the program for retrieving sound data of Embodiment 2. The program for retrieving sound data comprises a program for registering 51, a program for retrieving 52, and a sound database 53. The other arrangements and their functions are identical to those shown in the block diagram of Embodiment 1.

The program for registering 51 and the program for retrieving 52 are saved as a computer program for a personal computer or a microcomputer in a storage area (a memory, a hard disk drive, a floppy disk, etc.) of the computer. The sound database 53 like that of Embodiment 1 is an array of sound data stored in a recording medium, such as a hard disk drive or a CD-ROM, of the computer.

The program for registering 51 includes a sound data input process 54, a sound feature extracting process 55, an impression value calculating process 56, and a sound information input process 57. The program for registering 51 is initiated for extracting from a sound signal received by the computer a sound data and its attributed data which are then registered as retrieving data in the sound database 53. The data to be saved in the sound database 53 by the action of this program include a sound signal, sound features, sound impression values, and sound information.

The program for retrieving 52 includes a retrieving query input process 58, a predictive impression values calculating process 59, a sound impression values retrieving process 60, a sound data selection process 61, and a sound data output process 62. The program for retrieving 52 is initiated for entering queries from the user and calculating the sound impression values (target sound impression values) of a predicted sound data. Then, the retrieving queries and the target impression values are used as the retrieving key for retrieving the attributed data of the sound data stored in the sound database 53. As some of the sound data of which the attributed data are corresponded to the retrieving key have been read out as the candidates. They are examined for selection as the final sound data to be played back with reference to other criterion including the selection parameters translated by symbolizing from the selection controlling actions of the user and the predetermined sequence of the sound data. The finally selected sound data is then released as a result of the retrieving process.

Using the programs, any desired sound data can be accessed and received by the user entering the retrieving queries. The program for registering 51 and the program for retrieving 52 may be saved in removable mediums such as a CD-ROM 63, DVD-RAM, or DVD-ROM shown in FIG. 10 or a storage device of another computer over a computer network. Alternatively, the program for registering 51 and the program for retrieving 52 may be operated on two different computers respectively to access the sound database 53 having common storage areas. Also, the sound database 53 is produced and saved in any removable medium such as a floppy disk or an optical disk by the program for registering 51 and can be accessed by the program for retrieving 52 operated on another computer.

Embodiment 3

Figure 11:
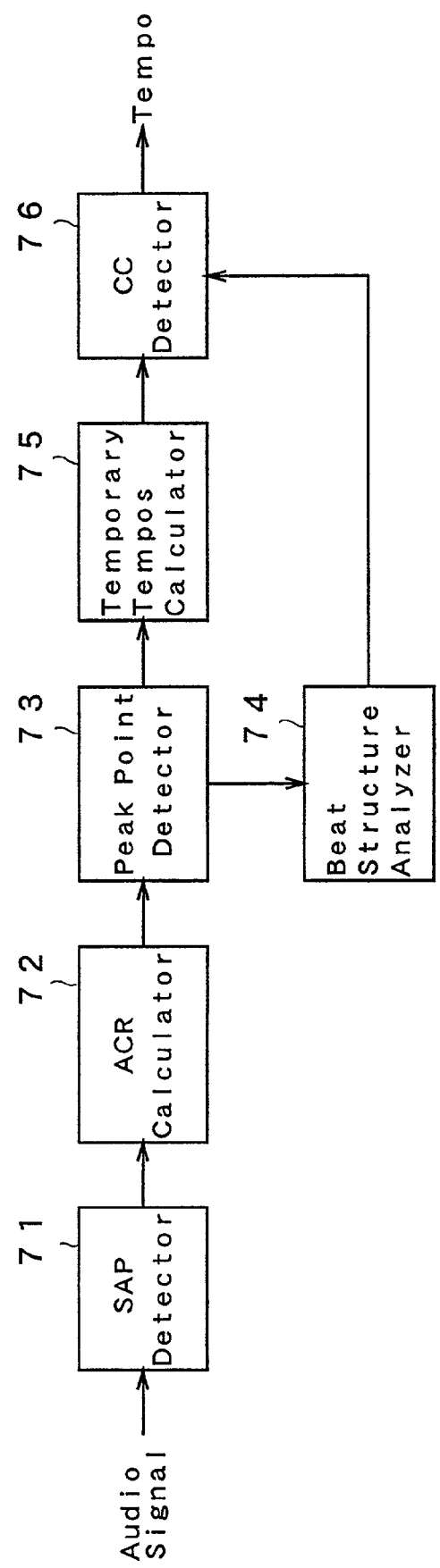
FIG. 11 is a block diagram showing a tempo extractor in Embodiment 3 of the present invention.

A tempo extracting method and its apparatus which represent one of the sound features extracting technologies will now be described. FIG. 11 is a block diagram showing an arrangement of the tempo extracting apparatus. The tempo extracting apparatus comprises a sound attack point detector 71 (referred to as an SAP detector hereinafter), an autocorrelation calculator 72 (referred to as an ACR calculator throughout the drawing), a peak point detector 73, a beat structure analyzer 74, a temporary tempos calculator 75, and a correct tempo detector 76 (referred to as a CC detector throughout the drawings).

The tempo extracting apparatus of this embodiment is designed for receiving a portion (about 30 seconds) of an audio signal as the input signal from a CD or a broadcast station. The SAP detector 71 detects the input signal for extracting the rise or onset time of sound components of e.g. snare drum, bass drum, guitar, and vocal. The SAP detector 71 generates a onset time sequence signal of the sound data based on the time and the amplitude.

An exemplary method of detecting the onset time in the audio signal is depicted in "Beat tracking system for music, audio signal-selection of the music knowledge depending on the detection of the number of measures and the presence of percussion sounds" by Gotoh and Muraoka, the Information Processing Society of Japan, Proceeding 97-MUS-21-8, Vol. 97, No. 67, pp. 45-52, 1997. In the method, an FFT (or DFT) process is performed to the inputted audio signal at each frame of a given length to determine the power of each frequency component. The rise of sound is thus detected by examining a degree of difference in the power between the frames. As a result, the onset time of each sound component can be assumed. A time sequence audio signal of the inputted sound data can be generated by aligning on the time base the assumed onset time of each time component and the power level at the time.

The ACR calculator 72 calculates an auto-correlation function of the time sequence audio signal of the sound data. Assuming that the time sequence audio signal is x[n], the delay time is m frames, and the calculation time takes N frames, the auto-correlation function A[m] based on the frame number m of the delay time can be calculated as the following Equation 17.

$$A(m) = \sum_{N=0}^{N-1} x(n) \cdot (n+m)$$ (Equation 17)

Figure 12:
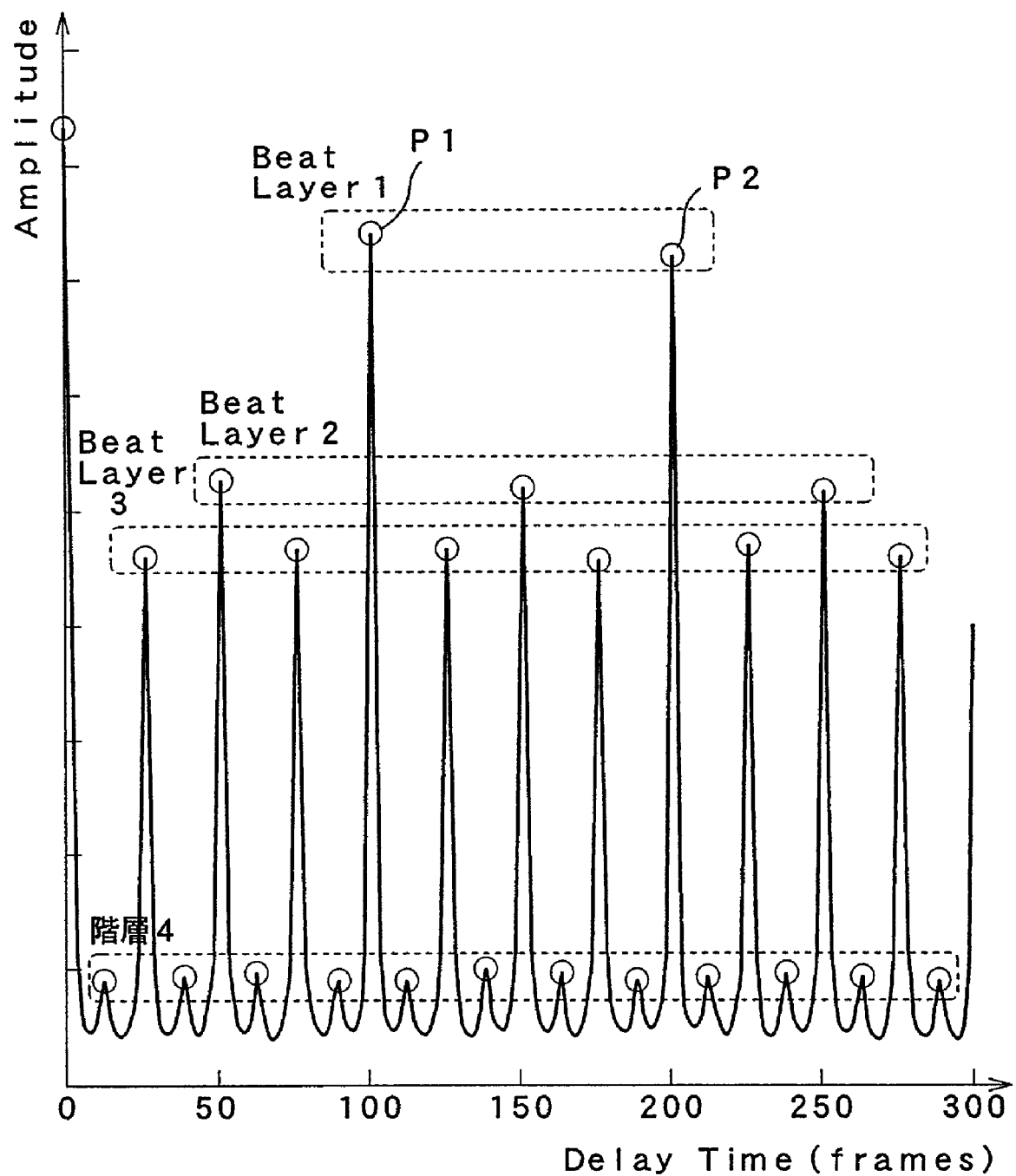
FIG. 12 is an explanatory diagram showing an example of the auto-correlation function determined by the tempo extractor in Embodiment 3 of the present invention.

An example of the auto-correlation function determine by the above manner is shown in FIG. 12. Tempo is detected based on these auto-correlation function. The peak point detector 73 calculates the peak or maximum of the auto-correlation function. In the example of FIG. 12, the peaks are denoted by the white dots.

The beat structure analyzer 74 analyzes a beat structure of the inputted audio signal through examining the peaks of the autocorrelation function received from the peak point detector 73. The auto-correlation function determined by the ACR calculator 72 represents the periodicity of sound components in the inputted audio signal. For example, when sound components of the bass drum are contained in the audio signal and beaten at equal intervals of a quarter note length, the peaks at every quarter note position in the auto-correlation function may appear. Accordingly, by monitoring the peaks and their levels in the auto-correlation function, the periodicity of the onset time or beat of each sound component in the audio signal can successfully be analyzed. The beat structure is hence a rhythm system of each sound component of the music and can be expressed by the frequency and the intensity of locations of the beat or the note (sixteenth note, eighth note, quarter note, half note, etc.). In the example of FIG. 12, the beat structure is understood to be composed of first to fourth beat layers from the periodicity and output levels of peaks. Each beat layer represents the intensity of the beat corresponding to the note of a given length (e.g. a quarter note).

Figure 13:
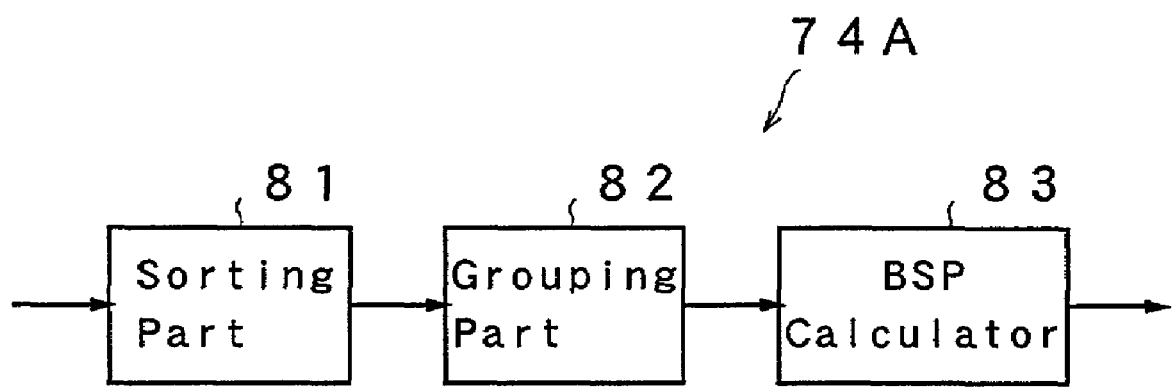
FIG. 13 is a block diagram showing a beat structure analyzer 74A in Embodiment 3 of the present invention.

FIG. 13 is a block diagram showing an arrangement of the beat structure analyzer 74A. The beat structure analyzer 74A includes a sorting part 81, a grouping part 82, and a beat structure parameters calculator 83 (referred to as a BSP calculator hereinafter and throughout the drawings). A procedure of beat structure analyzing in the arrangement is then explained. The sorting part 81 sorts the peak points of the auto-correlation function received from the peak point detector 73 shown in FIG. 11 in an order of amplitude. The peaks having similar amplitudes can then be grouped. The grouping part 82 separates the peaks into different amplitude groups. The BSP calculator 83 assigns the number of the groups as a beat layer number (four in this embodiment shown in FIG. 12) which is a parameter for defining the beat structure.

Figure 14:
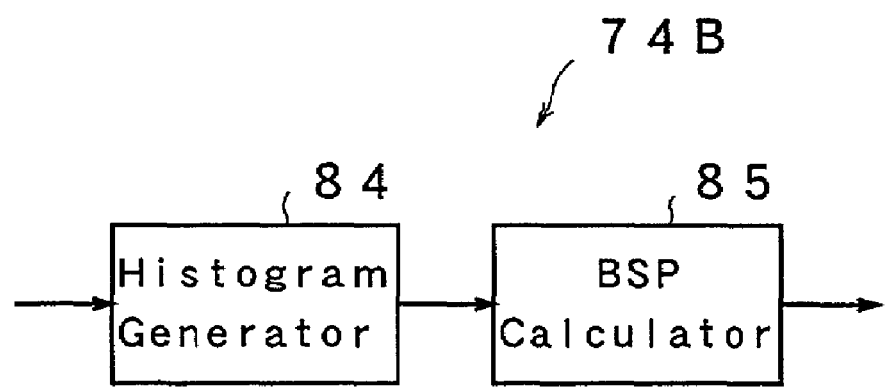
FIG. 14 is a block diagram showing another beat structure analyzer 74B in Embodiment 3 of the present invention.

FIG. 14 is a block diagram showing another beat structure analyzer 74B. The beat structure analyzer 74B includes a histogram generator 84 and a BSP calculator 85. This arrangement is different from that of the beat structure analyzer 74A shown in FIG. 13 by the fact that the histogram generator 84 is provided for grouping the peaks of the auto-correlation function. The histogram generator 84 generates a histogram based on the amplitude of the peaks. Thus, the histogram exhibits its maximum where a number of the peaks which are similar in amplitude is maximum. The BSP calculator 85 calculates the beat structure parameter from the peaks of the maximum histogram used for determining a distribution of the groups.

The action of the tempo extracting apparatus having the above described arrangement will now be explained. The temporary tempos calculator 75 calculates some tempo candidates for which is though the tempo of the inputted audio signal from the peaks determined by the peak point detector 73. In common, the sound components are beaten at equal intervals of one measure, tow beats (a half note), or one beat (a quarter note) with accents. Accordingly, the candidate for the tempo can be determined from the maximum of the peaks of the auto-correlation function. For example, modern popular music often has snare drum sounds beaten at every second and fourth timings (at intervals of two tempo interval times) for the accent. It is hence assumed that the peak in the audio signal of such a music becomes maximum at the timings equivalent to the intervals of the two tempo interval time.

In the example of FIG. 12, the peak P1 represents the maximum and the distance of time between the two peaks is equal to a length of one measure, two beats, or one beat. The tempo candidate is calculated from the number of quarter notes per minute determined by the duration to the peak P1 (100 frames, one frame being 86 ms). Accordingly, when duration of the peak P1 at equal intervals of one measure, two beats, and one beat, the tempo will be 207 BPM, 103 BPM, and 52 BPM, respectively. BPM stands for beats per minute as is a unit expressing the number of quarter notes per minute. The three measurements are now treated as the temporal tempo in FIG. 12.

With reference to the beat structure, e.g. the number of beat layers, obtained from the beat structure analyzer 74, the CC detector 76 selects the correct tempo, which is most appropriate for the inputted audio signal, from the candidates determined by the temporary tempos calculator 75. The number of beat layers in the beat structure is one of the major parameters for determining the tempo. It is known throughout a series of previous analyzing processes over various popular music scores that when the tempo of the music piece is fast, then the number of levels in the beat structure is low in number (namely, not greater than approximately three). For example, in case the candidates for the temporary tempo are 220 BPM and 105 BPM, and the number of beat layers in the beat structure is four, it is then judged that the tempo of 105 BPM is most probable. It is because a deep beat layer sounds or sixteenth notes rarely appear periodically and frequently in sound of a fast tempo as 220 BPM. This is very common among most popular music scores.

FIG. 12 illustrates beat layer 1 including another peak P2 which is similar in the amplitude to the peak P1 but doubled in the cycle. Beat layers 2 to 4 contains the peaks which are declined in the amplitude at every half the cycle. It is then concluded that beat layer 1 shows peaks of a cycle corresponding to two tempo interval time (a half note length), beat layer 2 shows peaks of a cycle corresponding to one tempo interval time (a quarter note length), level 3 shows peaks of a cycle corresponding to 0.5 tempo interval time (an eighth note length), and beat layer 4 shows peaks of a cycle corresponding to 0.25tempo interval time (a sixteenth note length).

Beat layer 1 may be at cycles of one full measure. It is however known in this case that beat layer 2 or lower may include a higher amplitude of the peak derived from the autocorrelation function of each common audio signal. Therefore, this embodiment is preferably arranged to assign the two tempo interval time to beat layer 1. Therefore, 103 BPM, which is one of the tempory tempos in case the beat layer 1, namely peak P1 is at the two tempo interval time is selected as a tempo of the inputted audio signal.

This embodiment is explained as to the audio signal having the autocorrelation function shown in FIG. 12 an example, but the present invention can be applied with equal success to any other audio signal having another autocorrelation function pattern.

It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

The text of japanese priority applications no. 2001-082150filed on Mar. 22, 2001 and no. 2001-221240 filed on Jul. 23, 2001 is hereby incorporated by reference.

What is claimed is:

1. A sound features extracting apparatus comprising:
   an audio signal input part which receives an audio signal of sound data including predetermined time frames;
   a first frequency analyzer which analyzes a plurality of frequency bands of each of the predetermined time frames of said audio signal received from said audio signal input part, and which outputs a signal for each of the frequency bands;
   a rise component calculator which detects a rise component in said signal of each of the frequency bands received from said first frequency analyzer, and which sums said rise components to determine a rise component for each time frame;
   an auto-correlation function calculator which calculates an auto-correlation function of said rise components;
   a second frequency analyzer which analyzes said auto-correlation function calculated by said auto-correlation function calculator, and which outputs a signal for each of the frequency bands;
   a direct-current component detector which detects a direct current component in said signal outputted from said second frequency analyzer;
   a peak detector which detects a signal of each of the frequency bands which is maximum in the power from said signal outputted from said second frequency analyzer; and
   a ratio calculator which divides the power of said output of said direct-current component detector by the power of said output of said peak detector, wherein
   said sound features extracting apparatus calculates a non-periodic property of sound emission which is a primary feature of said audio signal.

2. A sound features extracting apparatus comprising:
   an audio signal input part which receives an audio signal of sound data including predetermined time frames;
   a frequency analyzer which analyzes a plurality of frequency bands of each of the predetermined time frames of said audio signal received from said audio signal input part, and which outputs a signal for each of the frequency bands;
   a rise component calculator which detects a rise component in said signal of each of the frequency bands received from said frequency analyzer, and which sums said rise components to determine a rise component for each time frame;
   an auto-correlation function calculator which calculates an auto-correlation function of said rise components obtained from said rise component calculator;
   a peak calculator which calculates a position and an amplitude of each peak in said signal outputted from said auto-correlation function calculator;
   a tempo interval time candidate calculator which calculates some candidates for a tempo interval time of said sound data from said peaks of said auto-correlation function calculated by said peak calculator;
   a cycle structure calculator which calculates a cycle structure of said sound data from said peaks of said auto-correlation function calculated by said peak calculator; and
   a tempo interval time detector which determines a value of a most likely tempo interval time of said sound data from said candidates calculated by said tempo interval time candidate calculator with reference to said signal outputted from said rise component calculator and said signal outputted from said cycle structure calculator,
   wherein
   said sound features extracting apparatus calculates a tempo interval time which is a primary feature of said audio signal.

3. A sound features extracting apparatus according to claim 2, wherein
   said cycle structure calculator comprises:
   a sorting part which sorts said peaks by amplitude calculated by said peak calculator;
   a grouping part which separates said peaks sorted by said sorting part into groups, each group containing said peaks of similar amplitudes; and
   a cycle structure parameter calculator which calculates a parameter pertinent to said cycle structure including number of layers from different groups determined by said grouping part.

4. A sound features extracting apparatus according to claim 2, wherein
   said cycle structure calculator comprises:
   a histogram generator which generates a histogram based on an amplitude of a peak calculated by said peak calculator; and
   a cycle structure parameter calculator which calculates a parameter pertinent to the cycle structure of said sound data including number of layers from said histogram determined by said histogram generator.

5. A sound features extracting apparatus comprising:
   an audio signal input part which receives an audio signal of sound data including predetermined time frames;
   a first frequency analyzer which analyzes a plurality of frequency bands of each of the predetermined time frames of said audio signal received from said audio signal input part, and which outputs a signal for each of the frequency bands;
   a rise component calculator which detects a rise component in said signal of each of the frequency bands received from said first frequency analyzer, and which sums said rise components to determine said rise component for each time frame;
   an auto-correlation function calculator which calculates an auto-correlation function of said rise components outputted from said rise component calculator;

a first peak calculator which calculates a position and an amplitude of each peak in said signal outputted from said auto-correlation function calculator;
a tempo interval time candidate calculator which calculates some candidates for a tempo interval time of said sound data from said peaks of said auto-correlation function calculated by said first peak calculator;
a cycle structure calculator which calculates a cycle structure of said sound data from said peaks of the auto-correlation function calculated by said first peak calculator;
a tempo interval time detector which determines a value of a most likely tempo interval time of said sound data from said candidates calculated by said tempo interval time candidate calculator with reference to said signal outputted from said rise component calculator and said signal outputted from said cycle structure calculator;
a second frequency analyzer which analyzes said auto-correlation function and which outputs a signal for each of the frequency bands;
a second peak detector which detects a signal of each of the frequency bands which is maximum in the power from said signal outputted from said second frequency analyzer; and
a ratio calculator which calculates a ratio between said tempo interval time of said sound data outputted from said tempo interval time detector and said values outputted from said second peak detector, wherein
said sound features extracting apparatus calculates a ratio of the tempo interval time which is a primary feature of the audio signal.

6. A sound features extracting apparatus comprising:
an audio signal input part which receives an audio signal of sound data including predetermined time frames;
a first frequency analyzer which analyzes a plurality of frequency bands of each of the predetermined time frames of said audio signal received from the audio signal input part, and which outputs a signal for each of the frequency bands;
a rise component calculator which detects a rise component in said signal of each of the frequency bands received from said first frequency analyzer, and which sums said rise components to determine said rise component for each time frame;
an auto-correlation function calculator which calculates an auto-correlation function of said rise components outputted from said the rise component calculator;
a peak calculator which calculates a position and an amplitude of each peak in said signal outputted from said auto-correlation function calculator;
a tempo interval time candidate calculator which calculates some candidates for a tempo interval time of said sound data from said peaks of said auto-correlation function calculated by said peak calculator;
a cycle structure calculator which calculates a cycle structure of said sound data from said peaks of the auto-correlation function calculated by said peak calculator;
a tempo interval time detector which determines a value of a most likely tempo interval time of said sound data from said candidates calculated by said tempo interval time candidate calculator with reference to said signal outputted from said rise component calculator and said signal outputted from said cycle structure calculator;
a second frequency analyzer which analyzes said auto correlation function, and to which outputs a signal for each of the frequency bands;
a frequency calculator which calculates a frequency equal to said tempo interval time divided by an integer from said tempo interval time of said sound data outputted from said tempo interval time detector; and
a value reference part which refers the frequency output to said second frequency analyzer, and which outputs a value which represents a peak in proximity of the frequency outputted from said frequency calculator, wherein
said sound features extracting apparatus calculates said value of a beat intensity which is a primary feature of said audio signal.

7. A sound features extracting apparatus comprising:
an audio signal input part which receives an audio signal of sound data including predetermined time frames;
a first frequency analyzer which analyzes a plurality of frequency bands of each of the predetermined time frames of said audio signal received from the audio signal input part, and which outputs a signal for each of the frequency bands;
a rise component calculator which detects a rise component in said signal of each of the frequency bands received from said first frequency analyzer, and which sums said rise components to determine said rise component for each time frame;
an auto-correlation function calculator which calculates an auto-correlation function of said rise components outputted from said the rise component calculator;
a peak calculator which calculates a position and an amplitude of each peak in said signal outputted from said auto-correlation function calculator;
a tempo interval time candidate calculator which calculates some candidates for a tempo interval time of said sound data from said peaks of said auto-correlation function calculated by said peak calculator;
a cycle structure calculator which calculates a cycle structure of said sound data from said peaks of the auto-correlation function calculated by said peak calculator;
a tempo interval time detector which determines a value of a most likely tempo interval time of said sound data from said candidates calculated by said tempo interval time candidate calculator with reference to said signal outputted from said rise component calculator and said signal outputted from said cycle structure calculator;
a second frequency analyzer which analyzes said auto-correlation function, and to which outputs a signal for each of the frequency bands;
a first frequency calculator which calculates a frequency equal to said tempo interval time divided by an integer from said tempo interval time of said sound data outputted from said tempo interval time detector;
a first value reference part which refers the frequency output of said second frequency analyzer, and which outputs a value which represents a peak in proximity of the frequency output of said first frequency calculator;
a second frequency calculator which calculates a frequency equal to ¼ of said tempo interval time from said tempo interval time of said sound data determined by said tempo interval time detector;
a second value reference part which refers the frequency output of said second frequency analyzer and which outputs a value which represents a peak in proximity of said frequency output of said second frequency calculator; and a ratio calculator which calculates a ratio between said value output from said first value reference part and said value output from said second value reference part, wherein said sound features extracting apparatus calculates said ratio of beat intensity which is a primary feature of said audio signal.

8. A method for extracting sound features for extracting non-periodic property of sound emission from an audio signal of sound data, comprising the following steps of:

an input step for inputting said audio signal of said sound data including predetermined time frames;

a first frequency analyzing step for analyzing a plurality of frequency bands of each of the predetermined time frames of said audio signal received from said audio signal input step, and outputting a signal for each of the frequency bands;

a rise component calculating step for detecting a rise component in said signal of each of the frequency bands received from said first frequency analyzing step, and summing said rise components to determine a rise component for each time frame;

an auto-correlation function calculating step for calculating an auto-correlation function of said rise components;

a second frequency analyzing step for analyzing said auto-correlation function calculated by said auto-correlation function calculating step, and outputting a signal for each of the frequency bands;

a direct-current component detecting step for detecting a direct-current component in said signal outputted from said second frequency analyzing step;

a peak detecting step for detecting a signal of each of the frequency bands which is maximum in the power from said signal outputted from said second frequency analyzing step; and a ratio calculating step for dividing the power of said output of said direct-current component detecting step by the power of said output of said peak detecting step.

9. A method for extracting sound features for extracting tempo interval time from an audio signal of sound data, comprising the following steps of:

an input step for inputting said audio signal of said sound data including predetermined time frames;

a frequency analyzing step for analyzing a plurality of frequency bands of each of the predetermined time frames of said audio signal received from said audio signal input step, and outputting a signal for each of the frequency bands;

a rise component calculating step for detecting a rise component in said signal of each of the frequency bands received from said frequency analyzing step, and summing said rise components to determine rise component for each time frame;

an auto-correlation function calculating step for which calculating an auto-correlation function of said rise components obtained from said rise component calculating step;

a peak calculating step for calculating a position and an amplitude of each peak in said signal outputted from said auto-correlation function calculating step;

a tempo interval time candidate calculating step for calculating some candidates for a tempo interval time of said sound data from said peaks of said auto-correlation function calculated by said peak calculating step;

a cycle structure calculating step for calculating a cycle structure of said sound data from said peaks of said auto-correlation function calculated by said peak calculating step; and a tempo interval time detecting step for determining a value of a most likely tempo interval time of said sound data from said candidates calculated by said tempo interval time candidate calculating step with reference to said signal outputted from said rise component calculating step and said signal outputted from said cycle structure calculating step.

10. A method for extracting sound features for extracting a ratio of the tempo interval time from an audio signal of sound data, comprising the following steps of:

an input step for inputting said audio signal of said sound data including predetermined time frames;

a first frequency analyzing step for analyzing a plurality of frequency bands of each of the predetermined time frames of said audio signal received from said audio signal input step, and outputting a signal for each of the frequency bands;

a rise component calculating step for detecting a rise component in said signal of each of the frequency bands received from said first frequency analyzing step, and summing said rise components to determine said rise component for each time frame;

an auto-correlation function calculating step for calculating an auto-correlation function of said rise components outputted from said rise component calculating step;

a first peak calculating step for calculating a position and an amplitude of each peak in said signal outputted from said auto-correlation function calculating step;

a tempo interval time candidate calculating step for calculating some candidates for a tempo interval time of said sound data from said peaks of said auto-correlation function calculated by said first peak calculating step;

a cycle structure calculating step for calculating a cycle structure of said sound data from said peaks of the auto correlation function calculated by said first peak calculating step;

a tempo interval time detecting step for determining a value of a most likely tempo interval time of said sound data from said candidates calculated by said tempo interval time candidate calculating step with reference to said signal outputted from said rise component calculating step and said signal outputted from said cycle structure calculating step;

a second frequency analyzing step for analyzing said auto-correlation function and which outputs a signal for each of the frequency bands;

a second peak detecting step for detecting a signal of each of the frequency bands which is maximum in the power from said signal outputted from said second frequency analyzing step; and a ratio calculating step for calculating a ratio between said tempo interval time of said sound data outputted from said tempo interval time detecting step and said values outputted from said second peak detecting step.

11. A method for extracting sound features for extracting a value of a beat intensity from an audio signal of sound data, comprising the following steps of:

an input step for inputting said audio signal of said sound data including predetermined time frames;

a first frequency analyzing step for analyzing a plurality of frequency bands of each of the predetermined time frames of said audio signal received from the audio signal input step, and outputting a signal for each of the frequency bands;

a rise component calculating step for detecting a rise component in said signal of each of the frequency bands received from said first frequency analyzing step, and summing said rise components to determine said rise component for each time frame;

an auto-correlation function calculating step for calculating an auto-correlation function of said rise components outputted from said the rise component calculating step;

a peak calculating step for calculating a position and an amplitude of each peak in said signal outputted from said auto-correlation function calculating step;

a tempo interval time candidate calculating step for calculating some candidates for a tempo interval time of said sound data from said peaks of said auto-correlation function calculated by said peak calculating step;

a cycle structure calculating step for calculating a cycle structure of said sound data from said peaks of the auto-correlation function calculated by said peak calculating step;

a tempo interval time detecting step for determining a value of a most likely tempo interval time of said sound data from said candidates calculated by said tempo interval time candidate calculating step with reference to said signal outputted from said rise component calculating step and said signal outputted from said cycle structure calculating step;

a second frequency analyzing step for analyzing said auto-correlation function, and outputting a signal for each of the frequency bands;

a frequency calculating step for calculating a frequency equal to said tempo interval time divided by an integer from said tempo interval time of said sound data outputted from said tempo interval time detecting step; and a value referring step for referring the frequency output to said second frequency analyzing step, and outputting a value which represents a peak in proximity of the frequency outputted from said frequency calculating step.

12. A method for extracting sound features for extracting a ratio of beat intensity from an audio signal of sound data, comprising the following steps of:

an input step for inputting said audio signal of said sound data including predetermined time frames;

a first frequency analyzing step for analyzing a plurality of frequency bands of each of the predetermined time frames of said audio signal received from the audio signal input step, and outputting a signal for each of the frequency bands;

a rise component calculating step for detecting a rise component in said signal of each of the frequency bands received from said first frequency analyzing step, and summing said rise components to determine said rise component for each time frame;

an auto-correlation function calculating step for calculating an auto-correlation function of said rise components outputted from said the rise component calculating step;

a peak calculating step for calculating a position and an amplitude of each peak in said signal outputted from said auto-correlation function calculating step;

a tempo interval time candidate calculating step for calculating some candidates for a tempo interval time of said sound data from said peaks of said auto-correlation function calculated by said peak calculating step;

a cycle structure calculating step for calculating a cycle structure of said sound data from said peaks of the auto-correlation function calculated by said peak calculating step;

a tempo interval time detecting step for determining a value of a most likely tempo interval time of said sound data from said candidates calculated by said tempo interval time candidate calculating step with reference to said signal outputted from said rise component calculating step and said signal outputted from said cycle structure calculating step;

a second frequency analyzing step for analyzing said auto-correlation function, and outputting a signal for each of the frequency bands;

a first frequency calculating step for calculating a frequency equal to said tempo interval time divided by an integer from said tempo interval time of said sound data outputted from said tempo interval time detecting step;

a first value referring step for referring the frequency output of said second frequency analyzing step, and outputting a value which represents a peak in proximity of the frequency output of said first frequency calculating step;

a second frequency calculating step for calculating a frequency equal to ¼ of said tempo interval time from said tempo interval time of said sound data determined by said tempo interval time detecting step;

a second value referring step for referring the frequency output of said second frequency analyzing step and outputting a value which represents a peak in proximity of said frequency output of said second frequency calculating step; and a ratio calculating step for calculating a ratio between said value output from said first value referring step and said value output from said second value referring step.

13. A computer readable medium including a program for extracting sound features for extracting non-periodic property of sound emission from an audio signal of sound data, comprising the following steps of:

an input step for inputting said audio signal of said sound data including predetermined time frames;

a first frequency analyzing step for analyzing a plurality of frequency bands of each of the predetermined time frames of said audio signal received from said audio signal input step, and outputting a signal for each of the frequency bands;

a rise component calculating step for detecting a rise component in said signal of each of the frequency bands received from said first frequency analyzing step, and summing said rise components to determine rise component for each time frame;

an auto-correlation function calculating step for calculating an auto-correlation function of said rise components;

a second frequency analyzing step for analyzing said auto correlation function calculated by said auto-correlation function calculating step, and outputting a signal for each of the frequency bands;

a direct-current component detecting step for detecting a direct-current component in said signal outputted from said second frequency analyzing step;

a peak detecting step for detecting a signal of each of the frequency bands which is maximum in the power from said signal outputted from said second frequency analyzing step; and a ratio calculating step for dividing the power of said output of said direct-current component detecting step by the power of said output of said peak detecting step.

14. A computer readable medium including a program for extracting sound features for extracting tempo interval time from an audio signal of sound data, comprising the following steps of:
- an input step for inputting said audio signal of said sound data including predetermined time frames;
- a frequency analyzing step for analyzing a plurality of frequency bands of each of the predetermined time frames of said audio signal received from said audio signal input step, and outputting a signal for each of the frequency bands;
- a rise component calculating step for detecting a rise component in said signal of each of the frequency bands received from said frequency analyzing step, and summing said rise components to determine rise component for each time frame;
- an auto-correlation function calculating step for which calculating an auto-correlation function of said rise components obtained from said rise component calculating step;
- a peak calculating step for calculating a position and an amplitude of each peak in said signal outputted from said auto-correlation function calculating step;
- a tempo interval time candidate calculating step for calculating some candidates for a tempo interval time of said sound data from said peaks of said auto-correlation function calculated by said peak calculating step;
- a cycle structure calculating step for calculating a cycle structure of said sound data from said peaks of said auto-correlation function calculated by said peak calculating step; and
- a tempo interval time detecting step for determining a value of a most likely tempo interval time of said sound data from said candidates calculated by said tempo interval time candidate calculating step with reference to said signal outputted from said rise component calculating step and said signal outputted from said cycle structure calculating step.

15. A computer readable medium including a program for extracting sound features for extracting a ratio of the tempo interval time from an audio signal of sound data, comprising the following steps of:
- an input step for inputting said audio signal of said sound data including predetermined time frames;
- a first frequency analyzing step for analyzing a plurality of frequency bands of each of the predetermined time frames of said audio signal received from said audio signal input step, and outputting a signal for each of the frequency bands;
- a rise component calculating step for detecting a rise component in said signal of each of the frequency bands received from said first frequency analyzing step, and summing said rise components to determine said rise component for each time frame;
- an auto-correlation function calculating step for calculating an auto-correlation function of said rise components outputted from said rise component calculating step;
- a first peak calculating step for calculating a position and an amplitude of each peak in said signal outputted from said auto-correlation function calculating step;
- a tempo interval time candidate calculating step for calculating some candidates for a tempo interval time of said sound data from said peaks of said auto-correlation function calculated by said first peak calculating step;
- a cycle structure calculating step for calculating a cycle structure of said sound data from said peaks of the auto-correlation function calculated by said first peak calculating step;
- a tempo interval time detecting step for determining a value of a most likely tempo interval time of said sound data from said candidates calculated by said tempo interval time candidate calculating step with reference to said signal outputted from said rise component calculating step and said signal outputted from said cycle structure calculating step;
- a second frequency analyzing step for analyzing said auto-correlation function and which outputs a signal for each of the frequency bands;
- a second peak detecting step for detecting a signal of each of the frequency bands which is maximum in the power from said signal outputted from said second frequency analyzing step; and
- a ratio calculating step for calculating a ratio between said tempo interval time of said sound data outputted from said tempo interval time detecting step and said values outputted from said second peak detecting step.

16. A computer readable medium including a program for extracting sound features for extracting a value of a beat intensity from an audio signal of sound data, comprising the following steps of:
- an input step for inputting said audio signal of said sound data including predetermined time frames;
- a first frequency analyzing step for analyzing a plurality of frequency bands of each of the predetermined time frames of said audio signal received from the audio signal input step, and outputting a signal for each of the frequency bands;
- a rise component calculating step for detecting a rise component in said signal of each of the frequency bands received from said first frequency analyzing step, and summing said rise components to determine said rise component for each time frame;
- an auto-correlation function calculating step for calculating an auto-correlation function of said rise components outputted from said the rise component calculating step;
- a peak calculating step for calculating a position and an amplitude of each peak in said signal outputted from said auto-correlation function calculating step;
- a tempo interval time candidate calculating step for calculating some candidates for a tempo interval time of said sound data from said peaks of said auto-correlation function calculated by said peak calculating step;
- a cycle structure calculating step for calculating a cycle structure of said sound data from said peaks of the auto-correlation function calculated by said peak calculating step;
- a tempo interval time detecting step for determining a value of a most likely tempo interval time of said sound data from said candidates calculated by said tempo interval time candidate calculating step with reference to said signal outputted from said rise component calculating step and said signal outputted from said cycle structure calculating step;
- a second frequency analyzing step for analyzing said auto-correlation function, and outputting a signal for each of the frequency bands;
- a frequency calculating step for calculating a frequency equal to said tempo interval time divided by an integer from said tempo interval time of said sound data outputted from said tempo interval time detecting step; and a value referring step for referring the frequency output to said second frequency analyzing step, and outputting a value which represents a peak in proximity of the frequency outputted from said frequency calculating step.

17. A computer readable medium including a program for extracting sound features for extracting a ratio of beat intensity from an audio signal of sound data, comprising the following steps of:

an input step for inputting said audio signal of said sound data including predetermined time frames;

a first frequency analyzing step for analyzing a plurality of frequency bands of each of the predetermined time frames of said audio signal received from the audio signal input step, and outputting a signal for each of the frequency bands;

a rise component calculating step for detecting a rise component in said signal of each of the frequency bands received from said first frequency analyzing step, and summing said rise components to determine said rise component for each time frame;

an auto-correlation function calculating step for calculating an auto-correlation function of said rise components outputted from said the rise component calculating step;

a peak calculating step for calculating a position and an amplitude of each peak in said signal outputted from said auto-correlation function calculating step;

a tempo interval time candidate calculating step for calculating some candidates for a tempo interval time of said sound data from said peaks of said auto-correlation function calculated by said peak calculating step;

a cycle structure calculating step for calculating a cycle structure of said sound data from said peaks of the auto-correlation function calculated by said peak calculating step;

a tempo interval time detecting step for determining a value of a most likely tempo interval time of said sound data from said candidates calculated by said tempo interval time candidate calculating step with reference to said signal outputted from said rise component calculating step and said signal outputted from said cycle structure calculating step;

a second frequency analyzing step for analyzing said auto-correlation function, and outputting a signal for each of the frequency bands;

a first frequency calculating step for calculating a frequency equal to said tempo interval time divided by an integer from said tempo interval time of said sound data outputted from said tempo interval time detecting step;

a first value referring step for referring the frequency output of said second frequency analyzing step, and outputting a value which represents a peak in proximity of the frequency output of said first frequency calculating step;

a second frequency calculating step for calculating a frequency equal to ¼ of said tempo interval time from said tempo interval time of said sound data determined by said tempo interval time detecting step;

a second value referring step for referring the frequency output of said second frequency analyzing step and outputting a value which represents a peak in proximity of said frequency output of said second frequency calculating step; and a ratio calculating step for calculating a ratio between said value output from said first value referring step and said value output from said second value referring step.

* * * * *

UNITED STATES PATENT AND TRADEMARK OFFICE
CERTIFICATE OF CORRECTION

| | | |
|---|---|---|
| PATENT NO. | : 7,373,209 B2 | Page 1 of 1 |
| APPLICATION NO. | : 10/101569 | |
| DATED | : May 13, 2008 | |
| INVENTOR(S) | : Junichi Tagawa et al. | |

It is certified that error appears in the above-identified patent and that said Letters Patent is hereby corrected as shown below:

<u>Column 15</u> in claim 1, lines 47-48 "direct current" should read --direct-current--

<u>Column 17</u> in claim 6, lines 65-66 "auto correlation" should read --auto-correlation--

<u>Column 20</u> in claim 10, lines 39-40 "auto correlation" should read --auto-correlation--

Signed and Sealed this

Twelfth Day of August, 2008

JON W. DUDAS
*Director of the United States Patent and Trademark Office*